United States Patent
Unger et al.

(10) Patent No.: US 10,006,793 B2
(45) Date of Patent: Jun. 26, 2018

(54) SENSOR DEVICE FOR DETECTING AT LEAST ONE PROPERTY OF A FLUID MEDIUM FLOWING IN A CHANNEL

(71) Applicant: Robert Bosch GmbH, Stuttgart (DE)

(72) Inventors: Holger Unger, Remseck (DE); Edda Sommer, Stuttgart (DE); Manuel Blas Sancho De Castro, Waiblingen (DE); Ulrich Wagner, Munich (DE); Uwe Konzelmann, Asperg (DE); Michael Eppler, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 53 days.

(21) Appl. No.: 14/900,836

(22) PCT Filed: May 13, 2014

(86) PCT No.: PCT/EP2014/059767
§ 371 (c)(1),
(2) Date: Dec. 22, 2015

(87) PCT Pub. No.: WO2014/206629
PCT Pub. Date: Dec. 31, 2014

(65) Prior Publication Data
US 2016/0153819 A1    Jun. 2, 2016

(30) Foreign Application Priority Data
Jun. 26, 2013   (DE) .................. 10 2013 212 162

(51) Int. Cl.
*G01F 15/14*    (2006.01)
*G01F 1/684*    (2006.01)
(Continued)

(52) U.S. Cl.
CPC ....... *G01F 15/14* (2013.01); *F02M 35/10386* (2013.01); *G01F 1/684* (2013.01);
(Continued)

(58) Field of Classification Search
CPC . G01F 15/14; G01F 1/684; G01F 5/00; G01F 15/185; F02M 35/10386; F02D 41/187
(Continued)

(56) References Cited

U.S. PATENT DOCUMENTS

| 2002/0172789 | A1* | 11/2002 | Watson | ............... | B82Y 10/00 |
|---|---|---|---|---|---|
| | | | | | 428/36.91 |
| 2011/0148096 | A1* | 6/2011 | Engle | ...................... | G01K 1/14 |
| | | | | | 285/93 |
| 2013/0061684 | A1* | 3/2013 | Frauenholz | .......... | G01F 1/6842 |
| | | | | | 73/861 |

FOREIGN PATENT DOCUMENTS

| DE | 199 46 900 | 12/2000 |
|---|---|---|
| DE | 10 2005 057 574 | 6/2007 |

(Continued)

OTHER PUBLICATIONS

International Search Report for PCT/EP2014/059767, dated Jul. 23, 2014.

*Primary Examiner* — Manish S Shah
*Assistant Examiner* — Nigel Plumb
(74) *Attorney, Agent, or Firm* — Norton Rose Fulbright US LLP; Gerard Messina (57) ABSTRACT

A sensor device for detecting a property of a fluid medium flowing in a channel includes: (a) a channel piece through which a fluid medium is able to flow, the channel piece having (i) an inlet; (ii) an outlet; (iii) a channel piece wall including an inner wall, an outer side connecting the inlet and the outlet, and an insertion opening; and (iv) areas having electrical conductivity; (b) at least one sensor having a sensor housing and a sensor element situated in the sensor (Continued)

housing, the sensor housing being insertable through the insertion opening in the channel piece wall into the channel piece. The entire channel piece wall of the channel piece is completely made of electrically conductive plastic, the channel piece wall being at fixed electrical potentials.

12 Claims, 4 Drawing Sheets

(51) Int. Cl.
| | | |
|---|---|---|
| *F02M 35/10* | (2006.01) | |
| *F02D 41/18* | (2006.01) | |
| *G01F 5/00* | (2006.01) | |
| *G01F 15/18* | (2006.01) | |

(52) U.S. Cl.
CPC .............. *F02D 41/187* (2013.01); *G01F 5/00* (2013.01); *G01F 15/185* (2013.01)

(58) Field of Classification Search
USPC .......................................... 73/273, 272, 861
See application file for complete search history.

(56) References Cited

FOREIGN PATENT DOCUMENTS

| | | |
|---|---|---|
| DE | 10 2005 057 575 | 6/2007 |
| DE | 10 2010 020 264 | 12/2011 |
| DE | 20 2011 050287 | 9/2012 |
| EP | 1 855 090 | 11/2007 |
| EP | 2 339 311 | 6/2011 |
| EP | 2 735 782 | 5/2014 |

\* cited by examiner

SENSOR DEVICE FOR DETECTING AT LEAST ONE PROPERTY OF A FLUID MEDIUM FLOWING IN A CHANNEL

BACKGROUND OF THE INVENTION

1. Field of the Invention

The present invention relates to a sensor device for detecting at least one property of a fluid medium flowing in a channel.

2. Description of the Related Art

In many processes, for example in the field of process engineering, chemistry, mechanical engineering or in the field of internal combustion engines, the process must be supplied during certain process steps with a very particular mass of at least one fluid medium having well-defined properties, such as a temperature or a pressure. In particular, combustion processes which are to take place under controlled conditions are dependent on the precise determination of the gas mass and the properties of the fluid used. Different types of sensors are used to determine the flow rate of the fluid medium, its pressure and/or its temperature and are exposed to this fluid medium.

Over the service life of such a sensor device, it is possible for particles present in the flowing fluid to deposit on the sensor element of the sensor device determining the properties of the fluid medium and thus distort the measuring signal over time. In particular, particles which have become electrically charged or electrically polarized during their flow path are known to deposit on the sensor element and then remain permanently adhered thereto due to surface adhesion forces.

An air mass flow meter having a gradient field oil separation is known from published German patent application document DE 10 2005 057 574 A1. This air mass flow meter includes a gradient field generating device in the sensor housing in the area of the sensor element for air mass determination, the gradient field generating device being designed to generate an electrical field which has a field gradient and at least partially permeates the air mass flow. Oil droplets present in the air mass flow are electrically polarized. Due to the gradient field, a net force acts on the oil droplets, which may be used to drive the oil droplets away from the sensor surface and thereby prevent a contamination of the sensor surface.

An air mass flow meter having an electrical oil separation is known from published German patent application document DE 10 2005 057 575 A1. This air mass flow meter includes a field generating device in the sensor housing in the area of the sensor element for air mass determination, the field generating device being designed to generate a preferably at least partially homogeneous electrical field which permeates the air mass flow. In this embodiment of the hot film air mass flow meter, a contamination of the sensor surface by oil droplets may be prevented by electrical effects, in particular a deflection and/or precipitation of coagulated oil droplets.

The approaches described in this way for reducing particle deposits on the sensor element require a more complex design than conventional air-flow sensors and additionally necessitate the application of a high voltage, which is in the range of several 100 V to several 1000 V, to achieve the desired effects. To make such voltages available, either an additional high voltage terminal must be provided at the air-flow sensor or an additional component for voltage conversion is needed. Moreover, these approaches focus only on a removal of electrically charged oil droplets and do not prevent the creation of electrically charged particles.

An air mass flow meter including a housing made of a plastic acting in an electrically insulating manner is known from published German patent application document DE 10 2010 020 264 A1. A flow channel is formed in the housing of the air mass flow meter. In addition, a sensor element, which detects the air mass flowing in the flow channel, is situated in the housing. Furthermore, strip conductors are situated in the housing, which connect the sensor element to connector pins. To discharge electrostatically charged particles in the air mass flow and protect the sensor element in this way from the deposition of these particles, at least a portion of the flow channel situated in the housing has electrically dissipative properties in that this portion of the flow channel is produced, for example, from a plastic including conductive polymers and/or a plastic including conductive fibers and/or from plastic including conductive carbon black.

This approach also does not prevent the creation of electrically charged particles. With this approach, rather, already created electrically charged particles are discharged immediately in front of the sensor element as a result of an impact on the wall of the flow channel situated in the sensor housing. The production of such a device, in which portions of the sensor housing are made of electrically insulating plastic and other portions of the sensor housing are made of electrically conductive plastic, is complex and expensive from a manufacturing perspective.

BRIEF SUMMARY OF THE INVENTION

Compared to the related art, the sensor device according to the present invention for detecting at least one property of a fluid medium flowing in a channel has the advantage that the entire channel piece wall of the channel piece is completely made of electrically conductive plastic, whereby the manufacture of the channel piece may take place particularly easily and cost-effectively in a single production step, for example an injection molding process. As a result of at least one electrically conductive contacting element for electrical contacting of the channel piece wall being situated on the outer side of the channel piece or in the wall of the channel piece, the at least one contacting element being connectable to a fixed electrical potential (POT) outside of the channel piece, in particular the ground potential (GND), in such a way that the channel piece wall, in particular the entire channel piece wall, is at the fixed electrical potential (POT, GND), it is advantageously achieved that a reliable electrical contact is establishable with the channel piece in a particularly simple manner.

Due to the channel piece wall, which is at the fixed electrical potential (POT), in particular at the ground potential (GND), a deposition of particles, dirt particles, oil droplets or the like, which are present in the flowing fluid medium, on the sensor element is particularly advantageously prevented or at least drastically reduced. In the process, two effects come to bear.

As the first effect, the channel piece wall at the fixed electrical potential (POT, GND) advantageously causes the particles flowing in the channel piece not to become electrically charged in the first place, since they move in a kind of Faraday cage after their entry into the channel piece. The interior of the channel piece is thereby electrically shielded, and a polarization or charging of the particles by electrical fields in the channel piece which change unpredictably over time is thus effectively suppressed to a strong degree or even precluded. Such electrical fields in the channel piece which change unpredictably over time may be created, for example, by the internal friction of the air flow on an inner wall of the channel piece or by the friction of components connected to the channel piece situated upstream or downstream from the channel piece or by the irradiation of electromagnetic fields. In particular, electrically non-conductive plastics or materials which are not at a shared electrical potential, for example due to the separation of electrically conducting from electrically insulating sections, may in this way have differing charges which vary over time in different sections of such a channel piece. Such sections consequently also have different electrical fields acting on the interior of the channel piece, which in turn may result in a polarization or even electrical charging of particles.

As the second effect, due to the channel piece wall which is at the fixed electrical potential (POT), in particular at the ground potential (GND), it is advantageously effectuated that electrically charged particles, dirt particles or oil droplets are electrically reversed or discharged upon an impact contact with the channel piece wall, and in this way the likelihood of an electrostatic force-induced deposition of these particles on the sensor element may be considerably reduced. This effect acts both on particles present in the flowing fluid medium which are already electrically charged and/or electrically polarized upon entry into the interior of the channel piece, and on particles which are not electrically charged and/or electrically polarized until entry into the channel piece, for example with the aid of electrical fields induced by the internal friction of the air flow in the interior of the channel piece, or by electromagnetic fields irradiating from outside of the channel piece, for example from the vehicle electronics.

The particles may essentially be solids which are made of an electrically insulating material, for example. These solids may then be electrically polarized, i.e., have a positive excess charge at one end and a negative excess charge at the other end, for example. In sum, these particles are then potentially even electrically neutral or essentially neutral. Due to their electrically insulating material, however, the time for a charge equalization from one end of the particle to the other end may, in some circumstances, take longer than the particle is situated in the vicinity of the sensor element. As a result, it is quite possible for a particle thus polarized to be deflected by an electrostatic field and thus, e.g., to be drawn toward the sensor element. Moreover, it is possible that, upon contact with a wall at which a potential is present, possibly only the charge of the one portion of the particle which comes in contact with the wall is reversed, so that subsequently the sum of the electrical charges on the particle is changed.

It is therefore particularly advantageous when the formation of an electrical polarization, or even of an electrical charging of the particle, is preferably suppressed utilizing the first effect.

One refinement of the present invention provides that the channel piece is situated in a channel through which the fluid medium flows, the channel including a channel interior and a channel wall, at least portions of the fluid medium flowing through the channel flowing through the channel piece, the sensor housing being inserted through the channel and the insertion opening into the channel piece in such a way that the sensor element is exposed to the fluid medium flowing in the channel piece. In this refinement, the channel may be produced from a non-conducting plastic, a ceramic or a metal, for example. The refinement of the present invention allows an inexpensive production of the two, for example initially separately manufactured, elements of the channel and of the channel piece, which considerably reduces the manufacturing costs since a two-component injection molding process may be dispensed with, for example.

In one further refinement of the present invention, it is provided that the channel wall of the channel is made at least partially of electrically conductive plastic. This advantageously causes particles, dirt particles and/or oil droplets, which are already present in the flowing fluid medium, to be present already prior to entry into the channel piece in the manner of a Faraday cage, and in this way prevents an electrical polarization or an electrical charging, or upon impact contact between electrically charged or polarized particles with the channel wall of the channel, the charge of the particles is electrically reversed, or the particles are electrically neutralized, before they flow into the channel piece.

As a result of the sensor housing being made at least partially of electrically conductive plastic, in particular in the area in which the sensor element exposable to the fluid medium is situated, it is advantageously achieved that, from a time and space perspective, an electrical charging of particles, or an electrical polarization of particles, is also counteracted immediately prior to such particles flowing past the sensor element, and thus the risk of an electrostatically induced deposition of such particles on the sensor element is drastically reduced.

As a result of the electrically conductive plastic having a surface resistance of less than $10^{12} \Omega$ (ohm), it is advantageously achieved that the channel piece wall made of this electrically conductive plastic is reliably at one and the same fixed potential (POT, GND) on its inner side and on its outer wall. In this way, the effect of an electrical shielding in the manner of a Faraday cage in the interior of the channel piece is advantageously particularly reliably achieved.

In one refinement of the present invention, the at least one contacting element is designed as a screw, the screw being screwed into the channel piece wall and/or into the channel for electrical contacting of the channel piece wall and/or of the channel. In this way, it is advantageously achieved that the at least one contacting element is manufacturable particularly cost-effectively, and the screwing in effectuates a particularly reliable and durable mechanical and electrical contacting of the at least one contacting element with the channel piece wall or with the channel. In this way a permanent particularly low electrical contact resistance is particularly advantageously achieved between the at least one contacting element and the channel piece wall and/or the channel wall.

As a result of the at least one contacting element being situated in the cladding of the channel piece wall which delimits the insertion opening, and the at least one contacting element being electrically contacted by at least one potential plug contact situated on the sensor housing when the sensor housing is inserted into the channel piece, it is advantageously achieved that the at least one contacting element is securely and reliably electrically and mechanically contacted in a particularly simple manner, and that in this way the channel piece wall is connected to the fixed electrical potential (POT, GND) particularly reliably. The further advantage of such a specific embodiment is that, as a result of the thus situated at least one contacting element, this at least one contacting element does not project outwardly or into the interior of the channel piece, whereby damage of the contacting element and/or of the channel piece wall, for example, during the manufacturing process or during transport, is prevented.

Specific embodiments of the present invention are shown in the drawings and are described in greater detail in the following description.

BRIEF DESCRIPTION OF THE DRAWINGS

FIG. 1b shows a cross section through one specific embodiment of the sensor of FIG. 1a.

DETAILED DESCRIPTION OF THE INVENTION

Figure 1A:
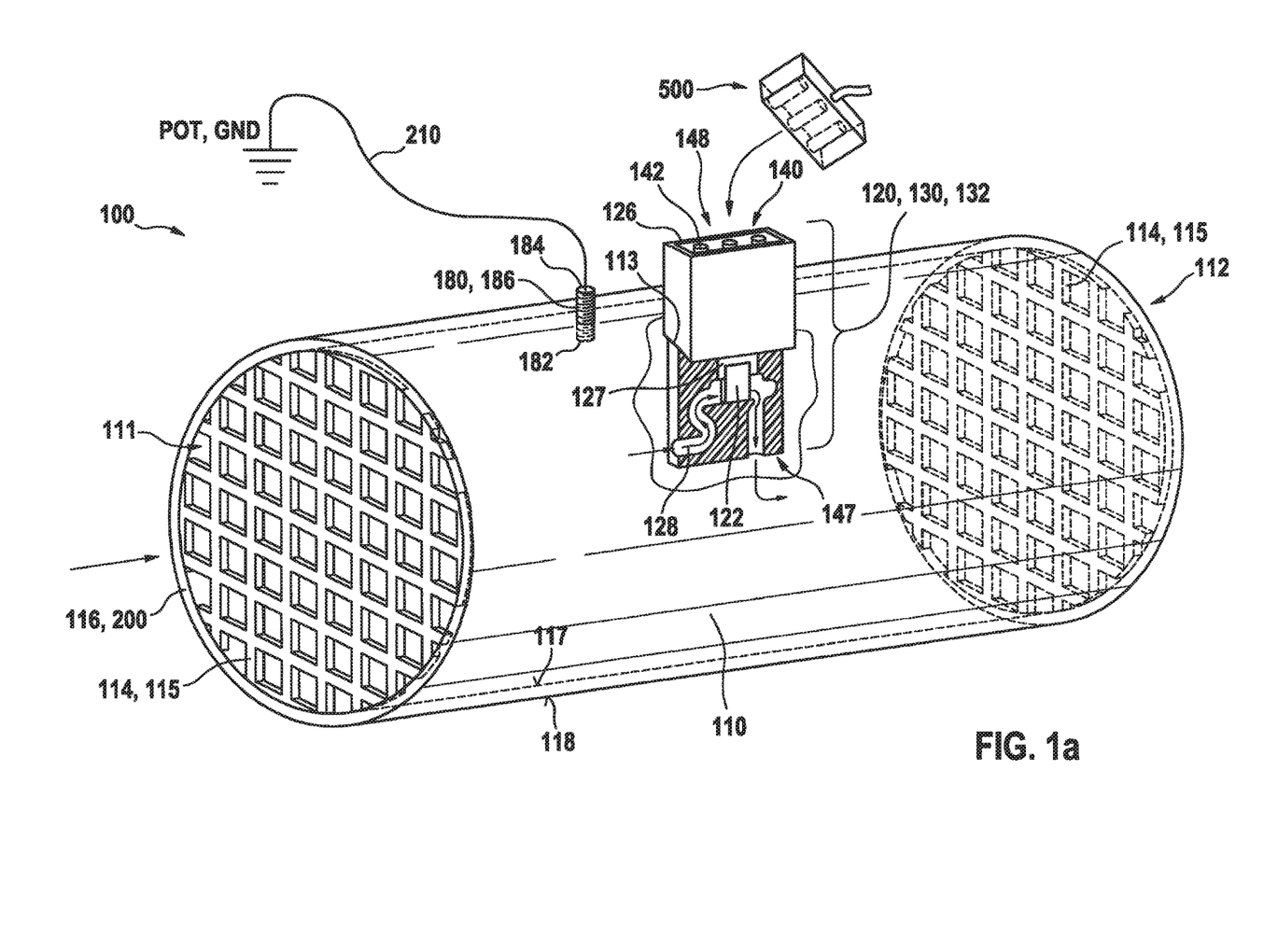
FIG. 1a shows a perspective view of a first specific embodiment of a sensor device according to the present invention.

FIG. 1a shows a first specific embodiment of a sensor device 100 according to the present invention for detecting at least one property of a fluid medium flowing in a channel. Sensor device 100 includes a channel piece 110 in the form of a flow tube through which the fluid medium is able to flow. At its two open ends situated in the axial extension direction, channel piece 110 includes an inlet 111 and an outlet 112 for the fluid medium flowing in the axial direction along the arrow shown in the figure. Tubular channel piece 110 furthermore includes a channel piece wall 116, which has an inner wall 117 and an outer side 118 connecting inlet 111 and outlet 112. Channel piece 110, together with its entire channel piece wall 116, is made completely of electrically conductive plastic 200.

Fluid medium within the meaning of the present application shall be understood to mean gaseous and/or liquid media or chemicals of all types, for example, air, exhaust gases, water, urea-water solution, fuels, cooling media, oils, water vapor, nitrogen, oxygen, hydrogen, methane, propane, butane, and the like, whose mass flow may be determined. Generally, sensor device 100 according to the present invention may be used to determine the mass flow of any fluid medium. Sensor device 100 according to the present invention may also be used to determine another property of the fluid medium, for example the absolute pressure of the fluid medium or a differential pressure as a difference of absolute pressures, of which at least one is attributable to the fluid medium.

The material of electrically conductive plastic 200 is composed of a plastic matrix which is electrically insulating in the pure state and to which electrically conductive fillers may be admixed for creating an electrically conductive plastic. Fillers may be, for example, metal powders, carbon black, carbon fibers, metal fibers, solder alloys, so-called carbon nanotubes or other nanoparticles. The fill level must exceed a certain minimum amount in order to form a sufficient number of electrically conductive paths within the material composite made up of the plastic matrix and the fillers. Starting at this so-called percolation limit, the electrical resistance is no longer infinitely large, and the electrical conductivity increases.

Such a composite material preferably reaches a specific electrical contact resistance of less than $10^6$ Ωcm (1,000,000 ohm centimeters), preferably of less than 1000 Ωcm or less than 500 Ωcm, most particularly preferably of less than 100 Ωcm. For the shielding effect of electrical or electromagnetic fields in the interior of channel piece 110 in the manner of a Faraday cage, the specific electrical contact resistance of the material of channel piece 110 and of channel piece wall 116 is particularly crucial. It is also crucial that the entire channel piece wall 116 is made of the electrically conductive material. To achieve this specific electrical contact resistance, the composite material contains between 0.1 vol. % and 70 vol. % electrically conductive fillers, for example.

In one preferred specific embodiment, such a composite material reaches a specific electrical surface resistance of less than $10^{12}$Ω (10 to the power of 12 ohm), the specific surface resistance is preferably in a range from $10^2$ ohm to $10^{11}$ ohm, most particularly preferably the specific surface resistance is in a range from 100 ohm to 10,000 ohm ($10^2$ ohm to $10^4$ ohm). In a further preferred range from $10^6$ ohm to $10^{11}$ ohm of the specific surface resistance, the specific surface resistance has so-called electrically dissipative properties.

The definition of the specific electrical contact resistance and of the specific electrical surface resistance and measuring methods for these two values are described in detail in the standard DIN IEC 60093 in the issue from December 1993 (Classification VDE 0303 Part 30).

In the shown specific embodiment of the present invention, a channel grate 114 formed of intersecting struts is situated at inlet 111 of channel piece 110, the channel grate keeping coarse dirt out of the interior of channel piece 110 and influencing the flow of fluid medium in the interior of channel piece 100. Channel grate 114 is preferably designed as an electrically conductive channel grate 115, for example by using metallic struts or struts produced from an electrically conductive plastic 200. A design as a metallic, electrically conductive channel grate 115 is also possible. Such a channel grate 114, preferably as an electrically conductive channel grate 115, may also be situated at outlet 112. Channel grate 114 at inlet 111 or at outlet 112 is preferably also electrically connected to channel piece wall 116 and is at the same electrical potential as channel piece wall 116.

Radially on its outer side 118, channel piece 110 furthermore has an insertion opening 113, which is suitable for inserting or introducing a sensor 120, which is also an integral part of the sensor device, into channel piece 110. This sensor 120 may be an air-flow sensor 130, for example, or a pressure sensor 132, or any arbitrary other sensor, which is suitable for detecting at least one property of a flowing fluid medium. Sensor 120 is preferably inserted into channel piece 110 in the radial direction.

Channel piece 110 furthermore includes at least one electrically conductive contacting element 180 having a first end 182 and a second end 184 facing away from first end 182. Contacting element 180 is mechanically fixed to channel piece wall 116, for example with its first end 182, and electrically connected to channel piece wall 116. The contact surfaces and the material of the at least one contacting element 180 are preferably designed in such a way that the electrical contact resistance between the at least one contacting element 180 and channel piece wall 116 is permanently preferably low. The at least one contacting element 180 is designed as a screw 186, for example, for fixation to channel piece wall 116, the at least one contacting element 180, 186 at its first end 182 having a screw thread with which contacting element 180, 186 is screwed into channel piece wall 116. Via an electrical line 210, second end 184 of the at least one contacting element 180 is electrically connected to a fixed electrical potential (POT) provided outside of channel piece 110, preferably to ground potential (GND).

As a result of channel piece 110 made of electrically conductive plastic 200, it is thus ensured that the entire channel piece wall 116 and electrically conductive channel grate 115 at inlet 111 and outlet 112 are electrically at fixed electrical potential (POT), in particular ground potential (GND). This design creates a kind of Faraday cage in the interior of channel piece 110, through which the flowing fluid medium flows together with particles possibly contained therein.

In the radial direction, a sensor 120 is introduced into channel piece 110 through insertion opening 113 in the shown specific embodiment of the present invention. Sensor 120 is an air-flow sensor 130 or a pressure sensor 132, for example. Sensor 120 includes a sensor housing 126 in which a carrier substrate 127 is situated. Carrier substrate 127 is designed as a circuit board (PCB) including strip conductors or as a ceramic carrier substrate. On its first sensor end 147 projecting into the interior of channel piece 110, sensor housing 126 of sensor 120 furthermore includes a flow channel 128 which is exposed to the flowing fluid medium through an opening facing the flow direction in channel piece 110. Flow channel 128 is preferably introduced in a curve-shaped manner into sensor housing 126 and the fluid medium flows through the same along the arrows indicated in flow channel 128. Sensor 120 furthermore includes a sensor element 122, which is situated on carrier substrate 127 and projects into flow channel 128. Sensor element 122 is used to detect the at least one property of the flowing fluid medium. Sensor element 122 is directly or indirectly electrically connected to plug contacts 142 which are situated on a connector element 140 of sensor housing 126. Connector element 140 is situated at a second sensor end 148 of sensor housing 126 which projects outwardly with respect to channel piece 110 and faces away from first sensor end 147 and may be electrically contacted with the aid of a mating connector 500.

Figure 1B:
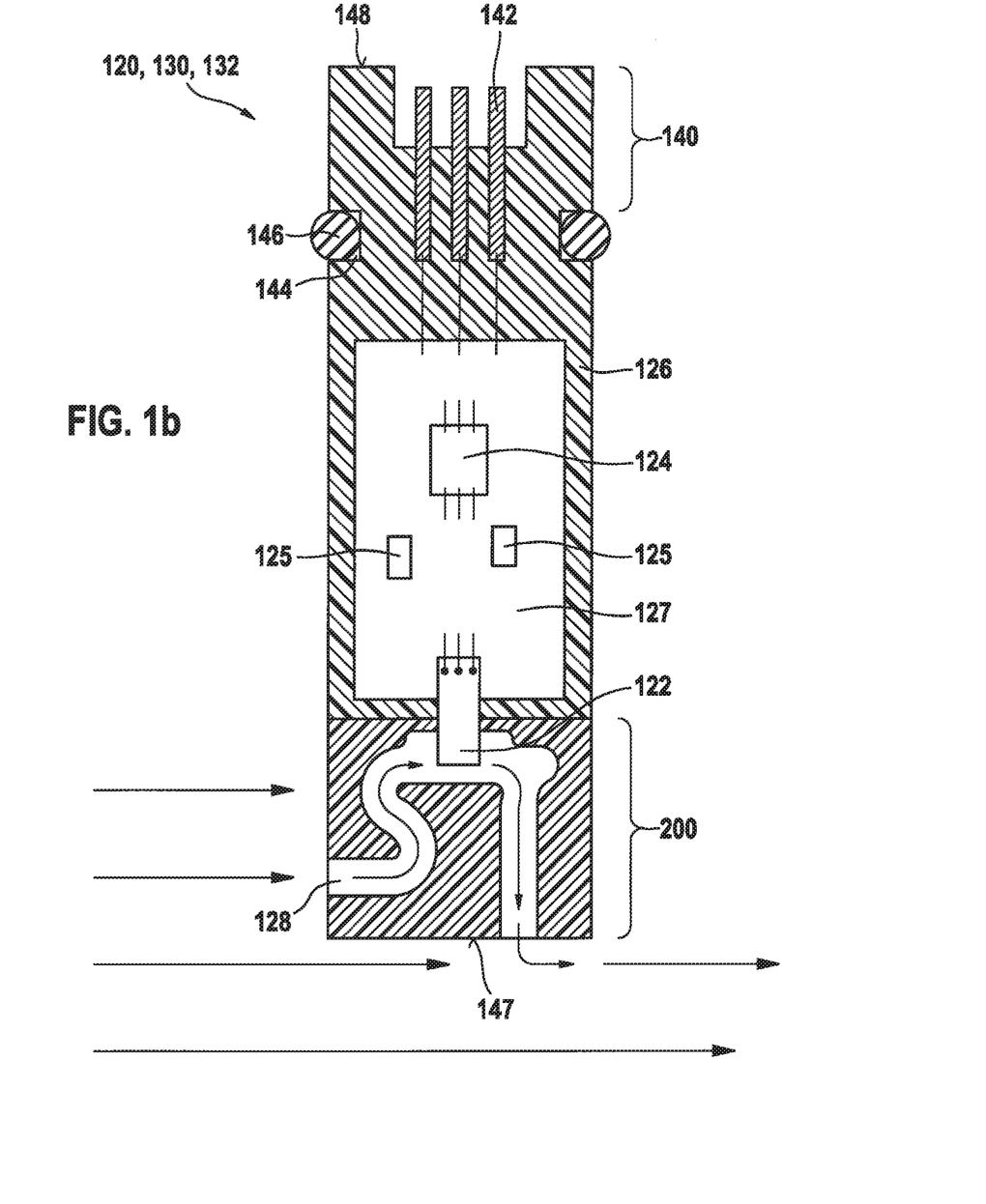

FIG. 1b shows sensor 120 shown in FIG. 1a in greater detail. Identical reference numerals denote the same features. Adjoining second sensor end 148 designed as connector element 140, sensor housing 126 of sensor 120 includes a recess 144 in which a sealing element 146, for example a commercially available O-ring, is mounted. With the aid of recess 144 and sealing element 146, sensor housing 126 may be fixed securely and preferably in a fluid-tight manner in channel piece 110, for example by latching in insertion opening 113. Sensor element 122 situated on carrier substrate 127 is electrically connected to carrier substrate 127 with the aid of electrical connecting elements. Electronic components 124, for example in the form of application-specific integrated circuits (ASICs), and passive electrical components 125, for example in the form of resistors, capacitors or coils, are situated on carrier substrate 127. Carrier substrate 127 itself is electrically connected to plug contacts 142 of connector element 140 with the aid of electrical connecting elements, such as bond wires.

The fluid medium flowing in FIG. 1b from left to right in the direction of the arrow flows in a serpentine manner through flow channel 128 situated at first sensor end 147. An inlet opening of flow channel 128 is situated on the left side of sensor housing 126 which faces the flow, while an outlet opening of flow channel 128 is situated on the side of the sensor housing which is directed downward in FIG. 1b. The inlet opening and the outlet opening of flow channel 128 and the shape of flow channel 128 may be adapted to the desired purpose of the sensor, other specific embodiments of the shape of flow channel 128 and of the position of its inlet opening and its outlet opening than shown in FIG. 1b also being possible.

Sensor housing 126 is preferably made of a non-conducting plastic, such as polybutylene terephthalate (PBT). To reduce the risk of an electrostatically induced deposition of particles on sensor element 122, however, in one preferred specific embodiment first sensor end 147, or also only portions of flow channel 128, may be made of an electrically conductive plastic 200 so that the effect of the Faraday cage also covers immediate surroundings of sensor element 122. In such an embodiment, sensor element 122 situated in sensor 120 is particularly reliably protected against the increased deposition of particles present in the flowing medium due to electrostatic charging.

Figure 2:
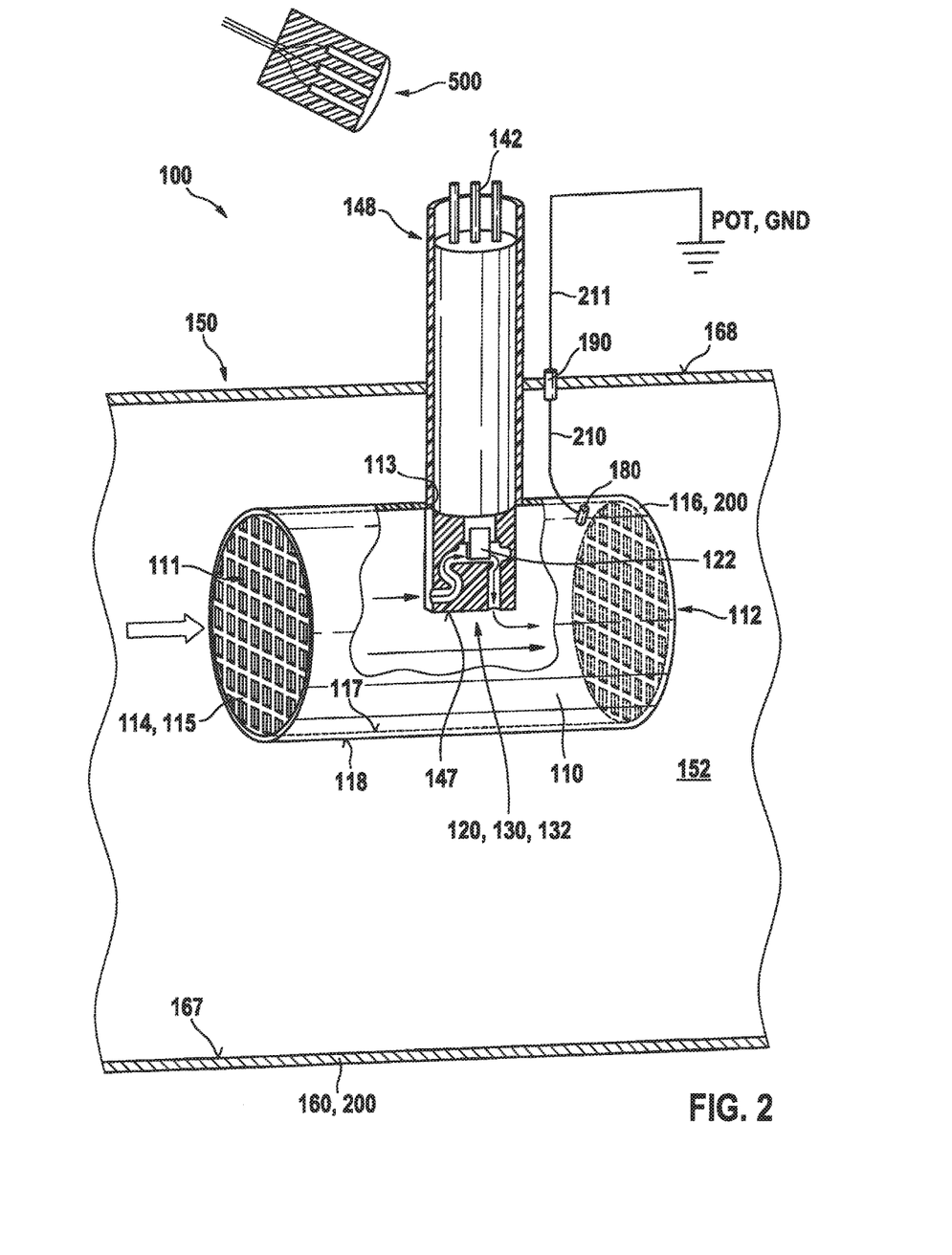
FIG. 2 shows a perspective cross section through a second specific embodiment of the sensor device according to the present invention.

FIG. 2 shows a further specific embodiment of the present invention. In this specific embodiment of sensor device 100 according to the present invention, channel piece 110 is situated in an interior 152 of a channel 150. Channel 150 includes a channel wall 160 having a channel inner cladding 167 and a channel outer side 168. The flowing fluid medium flows through tubular channel 150 in an axial direction along the arrows shown in FIG. 2. Portions of the flowing fluid medium reach the interior of channel piece 110 through inlet 111 of channel piece 110. There, the at least one property of the flowing fluid medium, for example a pressure, a temperature or an air mass, is determined with the aid of sensor 120, together with its sensor element 122, introduced through channel wall 160 and insertion opening 113 of channel piece 110.

Channel wall 160 may be made of an electrically insulating material or else of an electrically conductive material, for example an electrically conductive plastic 200. The connection of channel piece 110 and its channel piece wall 116 to fixed electrical potential (POT), in particular ground potential (GND), is established via the at least one electrical contacting element 180 on channel piece wall 116, electrical line 210, a further electrical contacting element 190 situated in channel wall 160 of channel 150, and a further electrical line 211. Further electrical contacting element 190 is preferably designed as an electrical feedthrough through channel wall 160 and suitable for placing a channel wall 160 made of electrically conductive plastic 200 also at fixed electrical potential (POT), in particular ground potential (GND). Further electrical contacting element 190 is moreover suitable for electrically contacting and mechanically fixing the further electrical line 211 on the side of the contacting element which faces outer side 168 of channel 150. Moreover, electrical line 210 may be electrically contacted and mechanically fixed on the side of further contacting element 190 which faces interior 152 of channel 150.

In this specific embodiment of the present invention, sensor 120 projects with its first sensor end 147 in the radial direction into channel piece 110, while its connector element 140 formed at second sensor end 148 projects with plug contacts 142 out of channel outer side 168 and is electrically contactable with the aid of a mating connector 500.

Channel piece 110 and/or channel 150 may be injection molded or extruded, for example. Multi-component injection molding processes and/or plastic welding processes lend themselves to creating electrically insulating areas, for example in channel 150. In this way, workpieces may be manufactured which are fluid- and pressure-tight and which, in addition to the electrically conductive plastic, may also contain insulating plastics or other electrical insulating materials (insulators) or electrical components, such as electrically conductive contacting elements 180, 190.

Figure 3:
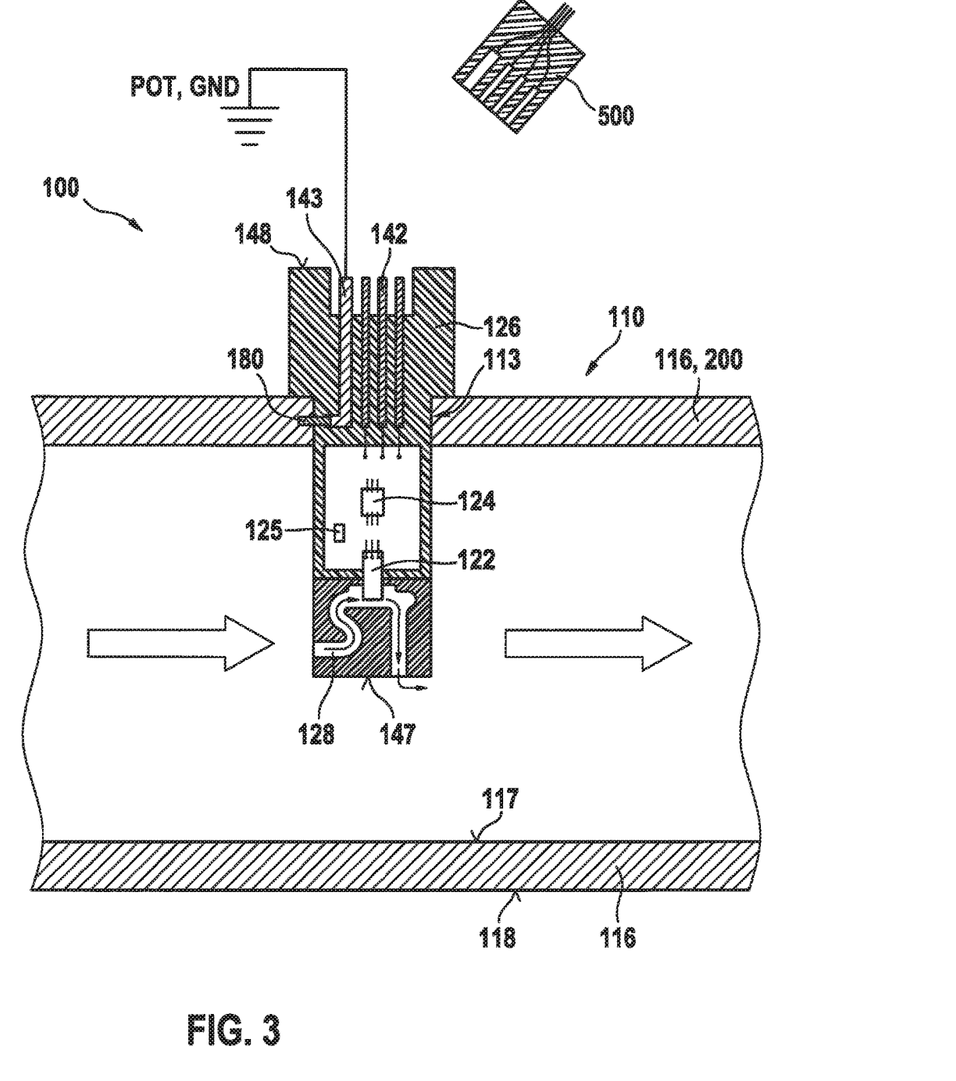
FIG. 3 shows a cross section through a third specific embodiment of the sensor device according to the present invention.

FIG. 3 shows a third specific embodiment of sensor device 100 according to the present invention. In this specific embodiment, the at least one electrical contacting element 180 is not situated on outer side 118, and also not on inner wall 117, of channel piece wall 116, but in the cladding of channel piece wall 116 which delimits insertion opening 113. In this way, the at least one electrical contacting element 180 no longer projects in the radial direction outwardly from channel piece wall 116 or into the interior of channel 150, but to a certain extent projects from the cladding delimiting insertion opening 113 in the axial direction into insertion opening 113. In this way, electrical contacting element 180 is particularly easily connectable to a potential plug contact 143 of sensor 120. For example, potential plug contact 143 is contactable with one end in connector element 140 of sensor 120 by a mating connector 500 and is conducted at the other end through the wall of sensor housing 126 in such a way that it makes electrical contact with the at least one electrical contacting element 180 when sensor 120 is inserted into insertion opening 113. Electrical contacting element 180 may also be designed as an electrically conductive coating, which is applied to a larger area of the cladding delimiting insertion opening 113 or even to the entire cladding delimiting insertion opening 113. Such an electrically conductive coating may be created, for example, with the aid of vapor deposition or a galvanic process. Metallic materials, preferably copper, silver or gold, are preferably suitable materials for such a coating. Such a coating which covers a larger area of the cladding delimiting insertion opening 113 and acts as the at least one contacting element 180 allows a particularly simple and secure contacting with a potential plug contact 143 situated in sensor housing 126. In its contact area with the at least one contacting element 180, matching potential plug contact 143 is formed, for example by an electrically conductive contact electrode surrounding sensor housing 126 in an annular manner, which is not shown here. This results in a particularly simple assembly with particularly reliable contacting, a particularly simple production of sensor housing 126 and, due to the large contacting surface, a particularly low electrical contact resistance between the at least one contacting element 180 and potential plug contact 143.

What is claimed is:

1. A sensor device for detecting at least one property of a fluid medium flowing in a channel, comprising:
   a channel piece through which a fluid medium flows, the channel piece having an inlet and an outlet and a channel piece wall which includes an inner wall and an outer side connecting the inlet and the outlet, the channel piece having an insertion opening situated in the channel piece wall, and the channel piece including areas having electrical conductivity; and
   at least one sensor having a sensor housing and a sensor element situated in the sensor housing, the sensor housing being configured to be selectively inserted through the insertion opening situated in the channel piece wall into the channel piece, and the sensor element being configured to be exposed to the flowing fluid medium and detect at least one property of the flowing fluid medium;
   wherein the entire channel piece wall of the channel piece is completely made of electrically conductive plastic, at least one electrically conductive contacting element for electrical contacting of the channel piece wall being situated one of on the outer side of the channel piece or in the cladding of the channel piece wall, the at least one contacting element being connected to a fixed electrical potential outside of the channel piece so that the channel piece wall is at the fixed electrical potential,
   wherein the channel piece wall or the cladding of the channel piece wall at the fixed electrical potential causes electrically charged particles, dirt particles or oil droplets flowing in the channel piece not to become electrically charged, so that an interior of the channel piece wall or the cladding of the channel piece wall is electrically shielded, and a polarization or charging of the particles by electrical fields in the channel piece wall or the cladding of the channel piece wall which change unpredictably over time is at least reduced or even precluded, and
   wherein due to the channel piece wall or the cladding of the channel piece wall which is at the fixed electrical potential, the electrically charged particles, the dirt particles or the oil droplets are electrically reversed or discharged upon an impact contact with the channel piece wall or the cladding of the channel piece wall, so as to at least reduce a likelihood of an electrostatic force-induced deposition of these particles on the sensor element.

2. The sensor device as recited in claim 1, wherein:
   the channel piece is situated in a channel through which the fluid medium flows, the channel including a channel interior and a channel wall, at least portions of the fluid medium which flow through the channel flowing through the channel piece; and
   the sensor housing is inserted through the channel and the insertion opening into the channel piece so that the sensor element is exposed to the fluid medium flowing in the channel piece.

3. The sensor device as recited in claim 2, wherein the channel wall of the channel is made at least partially of electrically conductive plastic.

4. The sensor device as recited in claim 2, wherein the sensor housing is made at least partially of electrically conductive plastic in an area in which the sensor element is exposed to the fluid medium.

5. The sensor device as recited in claim 1, wherein the electrically conductive plastic has a specific electrical contact resistance of less than $10^6$ Ωcm (ohm centimeters).

6. The sensor device as recited in claim 2, wherein the at least one contacting element is configured as a screw configured to be screwed into at least one of the channel piece wall and the channel wall for electrical contacting of at least one of the channel piece wall and the channel wall.

7. The sensor device as recited in claim 1, wherein the at least one contacting element is situated in a cladding of the channel piece wall which delimits the insertion opening.

8. The sensor device as recited in claim 7, wherein the at least one contacting element is electrically contacted by at least one potential plug contact situated on the sensor housing when the sensor housing is inserted into the channel piece.

9. The sensor device as recited in claim 1, wherein a channel grate formed of intersecting struts is situated at an inlet and/or an outlet of the channel piece, the channel grate keeping coarse dirt out of the interior of channel piece and influencing the flow of fluid medium in the interior of the channel piece.

10. The sensor device as recited in claim 9, wherein the channel grate at the inlet and/or at the outlet is electrically connected to the channel piece wall and is at the same electrical potential as the channel piece wall.

11. The sensor device as recited in claim 2, wherein a channel grate formed of intersecting struts is situated at an inlet and/or an outlet of the channel piece, the channel grate keeping coarse dirt out of the interior of channel piece and influencing the flow of fluid medium in the interior of the channel piece, and wherein the channel grate is configured as an electrically conductive channel grate by using metallic struts or electrically conductive plastic struts.

12. The sensor device as recited in claim 11, wherein the channel grate at the inlet and/or at the outlet is electrically connected to the channel piece wall and is at the same electrical potential as the channel piece wall.

* * * * *